United States Patent [19]
Inoue et al.

[11] Patent Number: 5,957,261
[45] Date of Patent: Sep. 28, 1999

[54] ROLLER AND METHOD OF MANUFACTURING THE ROLLER

[75] Inventors: Isao Inoue, Yokohama; Kenji Yoshida, Fujisawa; Haruyuki Yanagi, Machida; Masaya Shinmachi, Kawasaki, all of Japan

[73] Assignees: Canon Kabushiki Kaisha, Tokyo; Nifco Inc., Kanagawa-ken, both of Japan

[21] Appl. No.: 08/736,241

[22] Filed: Oct. 24, 1996

[30] Foreign Application Priority Data

Oct. 31, 1995 [JP] Japan .................................. 7-283932

[51] Int. Cl.$^6$ .................................................. B65G 13/00
[52] U.S. Cl. ................................................. 193/37; 492/56
[58] Field of Search .................................. 193/37; 492/56

[56] References Cited

U.S. PATENT DOCUMENTS 3,895,844 7/1975 Merbler ........................................ 193/37
4,203,509 5/1980 Thompson et al. ........................ 193/37

FOREIGN PATENT DOCUMENTS 1-58540 4/1989 Japan .

Primary Examiner—William E. Terrell
Assistant Examiner—Mark Deuble
Attorney, Agent, or Firm—Fitzpatrick, Cella, Harper & Scinto

[57] ABSTRACT

The present invention enables a roller in which a radially outwardly protruding flange-like portion is formed on the outer peripheral portion of a roller body portion made of hard synthetic resin and presenting a substantially disc-like shape.

2 Claims, 8 Drawing Sheets

ROLLER AND METHOD OF MANUFACTURING THE ROLLER

BACKGROUND OF THE INVENTION

1. Field of the Invention

This invention relates to improvements in a roller provided with a shock absorbing member of a rubber-like elastic material on the outer peripheral portion thereof.

2. Related Background Art

As a roller provided with a shock absorbing member of a rubber-like elastic material (rubber material or elastically deformable synthetic resin) on the outer peripheral portion thereof, there is known a roller 100 shown in FIGS. 7 and 8. This roller 100 is provided with an annular groove 102 on the outer peripheral portion of a body portion 101 forming a disc-like shape, and has an annular rubber ring 103 fitted in this groove 102.

Also, there is generally known a conveying roller 200 as shown in FIG. 9 wherein rollers 202 formed of thermoplastic elastomer are integrally provided on a shaft 201 (see Japanese Utility Model Application Laid-Open No. 1-58540).

As described above, the roller 100 shown in FIGS. 7 and 8 comprises the rubber ring 103 discrete from the body portion 101 and fitted in the annular groove 102 formed in the outer peripheral portion of the body portion 101. Therefore, this roller 100 has not been the possibility that when the bad conveyance of an article being conveyed occurs, for example, when paper jam or the like occurs during paper conveyance in a copying apparatus or the like, a force acts in a direction to draw the rubber ring 103 out of the groove 102 due to the rotational force of the roller 100 and therefore, the whole or part of the rubber ring 103 slips out of the groove 102. If so, in order to prevent such slipping-out, the groove 102 in the body portion 101 in which the rubber ring 103 is fitted is made too deep, it will be anticipated that the protrusion dimension of the rubber ring 103 from within the groove 102 becomes small and the shock absorbing function of this rubber ring 103 is reduced.

Also, in some cases, there has been the possibility that the rubber ring 103 slips in the groove 102 of the body portion 101 and the rotational force of the roller 100 cannot be made to appropriately act on an article being conveyed. Also, in the manufacture of the roller 100, there has been required the trouble of fitting the rubber ring 103 into the groove 102 of the body portion 101.

On the other hand, as for the conveying roller 200 shown in FIG. 9, the rollers 202 formed of thermoplastic elastomer are integrally provided on the shaft 201 and therefore, there is no possibility of the rollers 202 slipping off the shaft 201, however, the shape keeping power of the rollers 202 is low and this has unavoidably led to the necessity of making the rollers 202 relatively thick toward the axial direction of the shaft 201 in order to give the rollers 202 a certain degree of rigidity so that when an article or the like being conveyed is urged against the rollers 202, no hindrance may be caused in the conveyance of the article by the deformation of the rollers 202.

SUMMARY OF THE INVENTION

So, this invention has as its object to eliminate the inconveniences peculiar to the rollers 100 and 200 according to the prior art, i.e., to enable a roller integrally provided with a shock absorbing member on the outer peripheral portion thereof to be easily manufactured, and to enable such roller to be compactly constructed without the function of the roller being spoiled.

To achieve the above object, the roller of the present invention is featured by that an annular shock absorbing member made of a rubber-like elastic material is integrally formed on the outer peripheral portion of a roller body portion made of hard synthetic resin and presenting a substantially disk-like shape.

The roller of the present invention is featured by that a radially outwardly protruding flange-like portion is formed on the outer peripheral portion of the roller body, and said shock absorbing member is integrally formed on the outer peripheral portion of said roller body portion so as to radially outwardly protrude by a predetermined amount from said flange-like portion.

The roller of the present invention is featured by that the flange-like portion, one side of said shock absorbing member, the outer peripheral portion of said roller body portion and the inner peripheral surface of said shock absorbing member are made integral with one another.

The roller of the present invention is featured by that radially outwardly protruding flange-like portions are formed at predetermined intervals on the outer peripheral portion of the roller body portion, and said shock absorbing member is formed in a pair so as to radially outwardly protrude by a predetermined amount from said flange-like portions.

The roller of the present invention of is featured by that the pair of flange-like portions, the side of said shock absorbing member, the outer peripheral portion of said roller body portion and the inner peripheral surface of said shock absorbing member are made integral with one another.

The roller of the present invention is featured by that the shock absorbing member comprises an injection-moldable rubber-like elastic member, and said roller body portion is formed of synthetic resin which is not deformed by the temperature during the injection molding of said shock absorbing member.

The method of the present invention is featured by that a roller body portion made of hard synthetic resin and presenting a substantially disc-like shape is contained in a cavity, and a rubber-like elastic member is injected into the cavity on the outer peripheral side of said roller body portion. Thus, a shock absorbing member comprising said rubber-like elastic member is integrally formed on the outer peripheral portion of said roller body portion.

DESCRIPTION OF THE PREFERRED EMBODIMENTS

Figure 1:
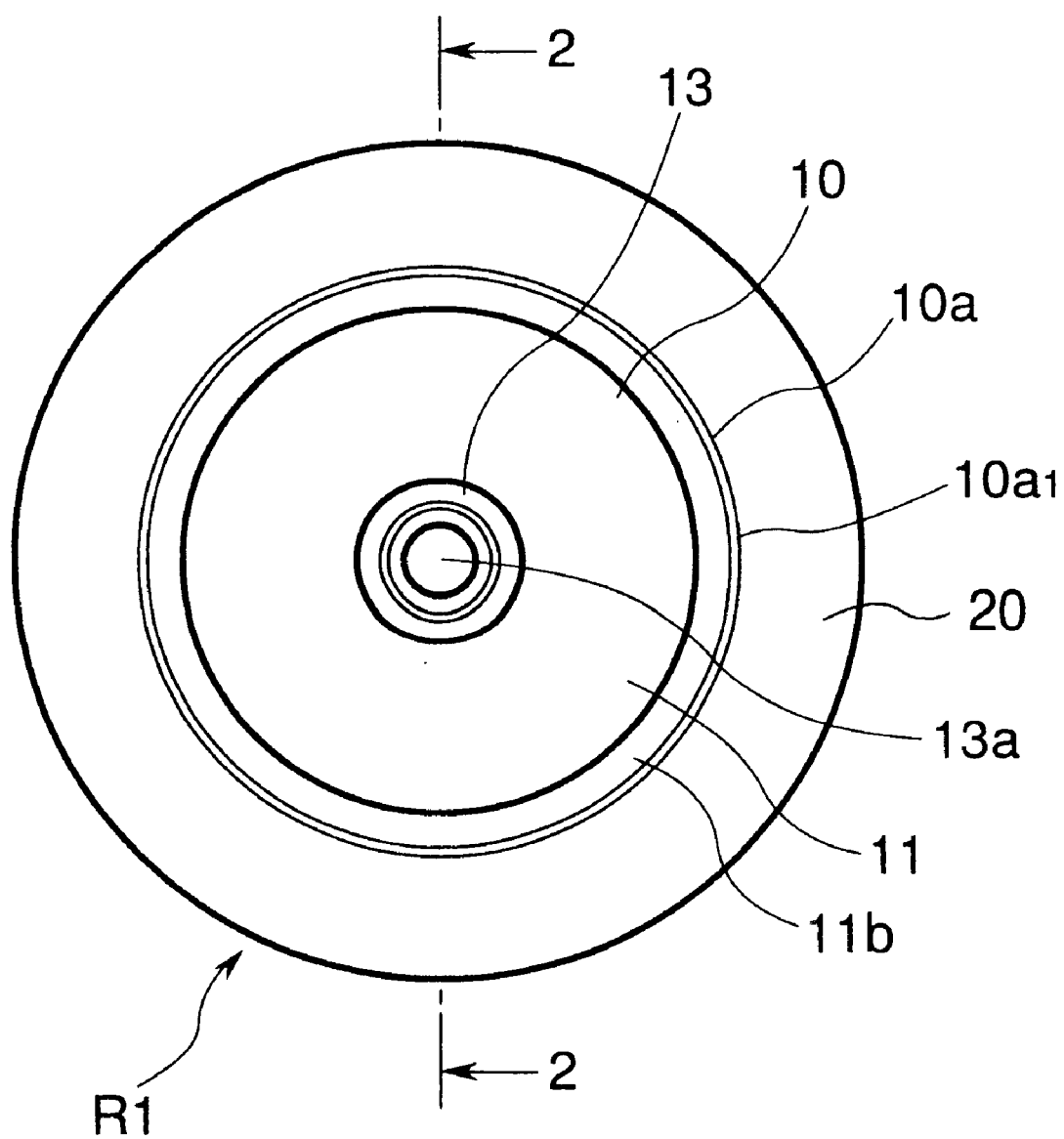
FIG. 1 is one side view of a roller R1 according to a first embodiment of the present invention.
Figure 2:
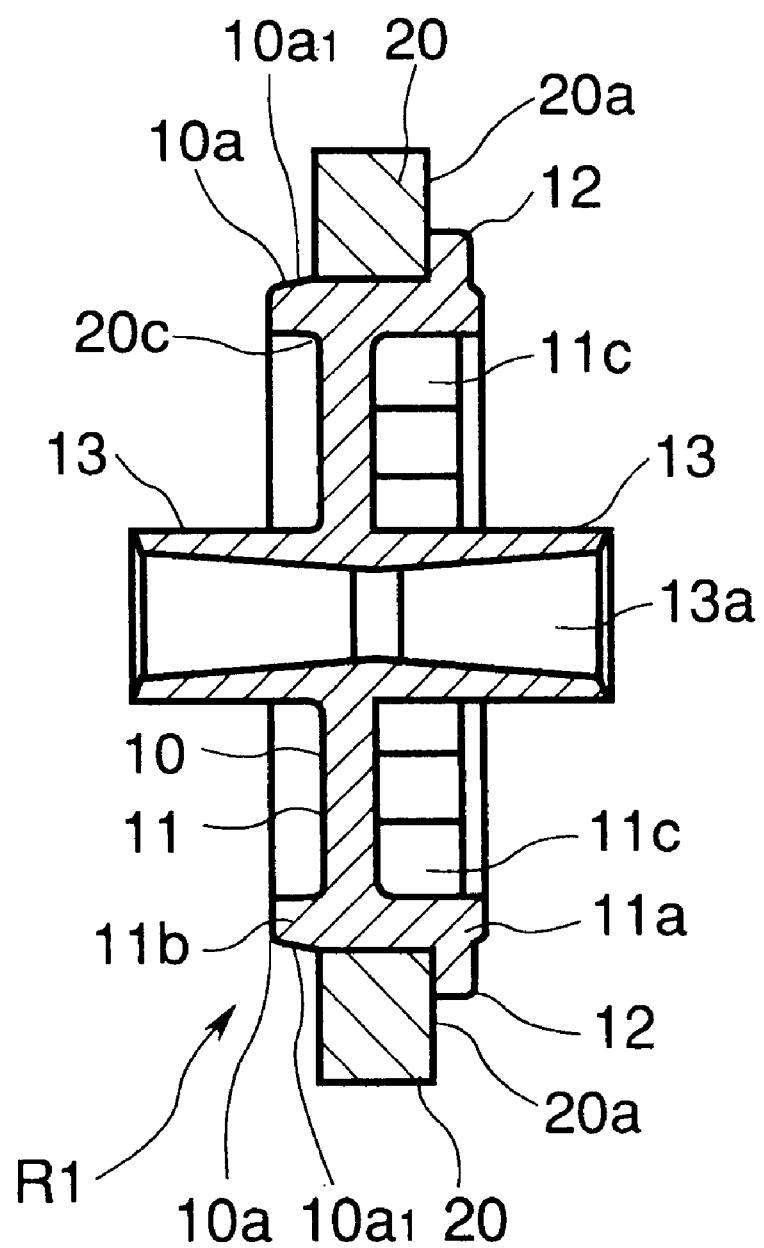
FIG. 2 is a cross-sectional view taken along line 2—2 in FIG. 1.

Some embodiments of the present invention will hereinafter be described in detail with reference to the drawings.

(First Embodiment)

A first embodiment of the present invention will hereinafter be described with reference to FIGS. 1 to 5.

The basic construction of the roller R1 according to this embodiment is provided with a disc-like roller body portion 10, and an annular shock absorbing member 20 integrally formed on the outer peripheral portion 10a of the roller body portion 10. The shock absorbing member 20 is formed of a rubber material as a rubber-like elastic member or a synthetic resin material having elasticity. Accordingly, this roller R1 very little injures an article or a member being conveyed because the shock absorbing member 20 having elasticity contacts with the article or the member, and can make a moderate frictional force act on the article or the member, and can rotate and convey the article or the member well.

Also, the shock absorbing member 20 is integrally provided on the outer peripheral portion 10a of the roller body portion 10 and can therefore contact with the article or the member being conveyed to thereby make the rotational force of the roller body portion 10 act always accurately on the article or the member. Also, the roller body portion 10 of the roller R1 is hard as compared with the shock absorbing member 20, and is formed of a plastic material which is not deformed by the heating temperature when the shock absorbing member 20 is integrally molded (injection-molded) on the outer peripheral portion 10a of the roller body portion 10.

As a result, the roller R1 is such that when it conveys an article or the like, the portion thereof which is urged against and deformed by the article or the like is limited to the portion of the shock absorbing member 20 provided on the outer peripheral portion 10a. The roller body portion 10 is difficult to elastically deform and thus, the shape keeping power of the roller R1 can be maintained high.

The structure of the roller will be described in greater detail.

The roller body portion 10 is provided with substantially annular circumferential wall portions 11a and 11b extending on the opposite sides (the right and left as viewed in FIG. 2) of the outer peripheral portion 10a of a substantially circular base portion 11, and a pair of shaft boss portion 13 extending on the opposite sides of the central portion of the base portion 11. Also, the roller body portion 10 is provided with a shaft hole 13a extending rightwardly and leftwardly through the pair of shaft boss portion 13. The axis of this shaft hole 13a is substantially orthogonal to the base portion 11. Also, an annular shock absorbing member 20 is integrally provided (integrally formed) on the outer peripheral portion 10a of the roller body portion 10 which is substantially parallel to the axial direction of the shaft hole 13a.

An annular flange-like portion 12 protruding radially outwardly from the outer peripheral surface $10a_1$ is formed on one circumferential wall portion 11a provided on the outer peripheral portion 10a of the roller body portion 10. The shock absorbing member 20 is integrally formed on the outer peripheral portion 10a of the roller body portion 10 so that one side 20a thereof may contact with the flange-like portion 12 and the inner peripheral surface 20c thereof may contact with the outer peripheral surface $10a_1$, and further protrude radially outwardly by a predetermined amount from the flange-like portion 12.

As a result, the area over which the roller body portion 10 and the shock absorbing member 20 are in integral contact with each other is relatively wide (wide as compared with a case where the inner peripheral surface 20c of the shock absorbing member 20 is simply integrally formed on the outer peripheral portion 10c) and the flange-like portion 12 is in integral contact with (secured to) the side of the shock absorbing member 20. Therefore, even when the roller R1 is urged against an article or the like being conveyed, the shock absorbing member 20 is not deformed more than necessary, and thus the inconvenience that the radially outer end surface of the shock absorbing member 20 does not come into appropriate contact with the article or the like hardly occurs.

Also, in the roller R1 according to the present embodiment, the shock absorbing member 20 is formed of a rubber material as a rubber-like elastic material or elastically deformable synthetic resin. That the roller body portion 10 is formed of a plastic material which is hard as compared with the shock absorbing member 20 and is not deformed by heating accompanying the molding (injection molding) of the shock absorbing member 20. For example, one of the best embodiments that elastomer of polypropylene is used as the constituent material of the shock absorbing member 20 and hard polypropylene is used as the constituent material of the roller body portion 10.

Figure 4:
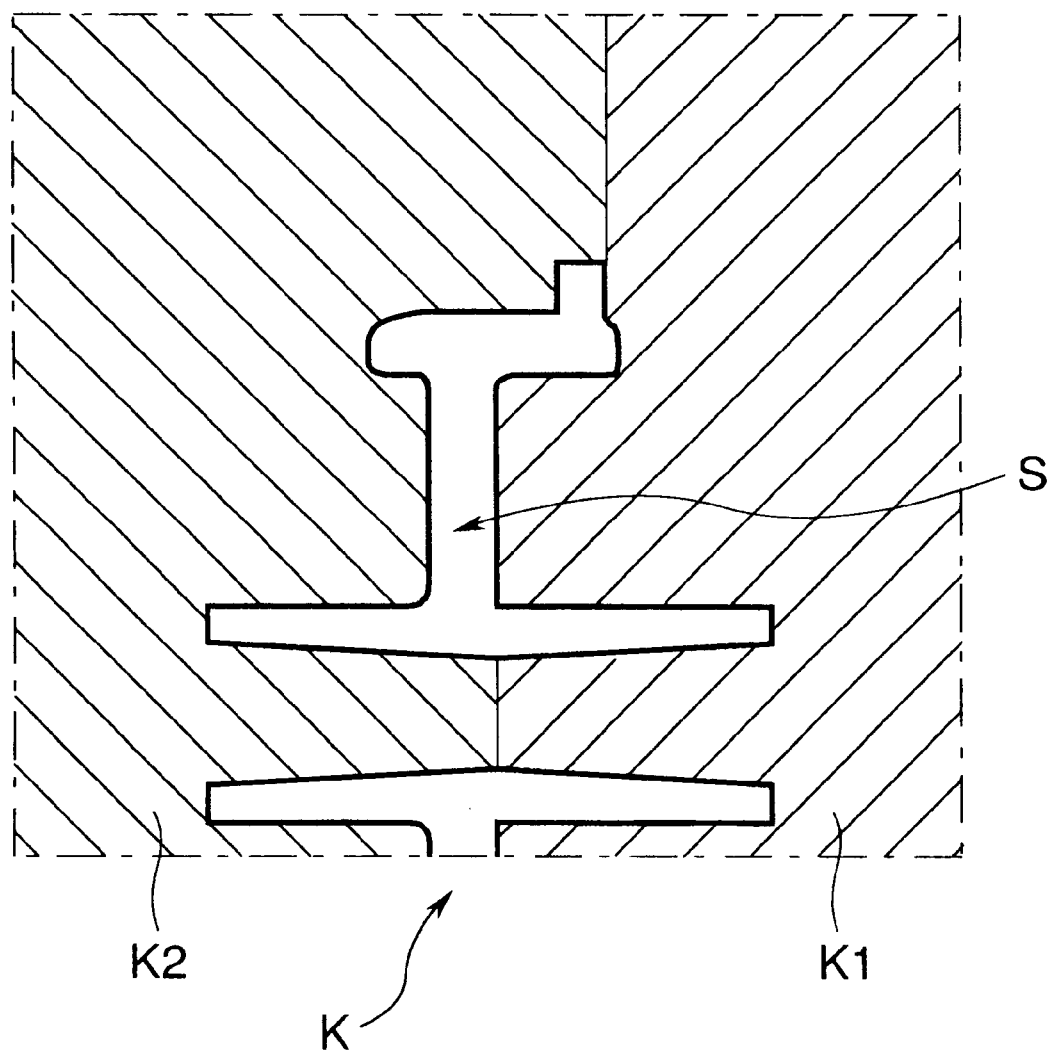
FIG. 4 is a cross-sectional view showing the essential portions of a metal mold K.
Figure 5:
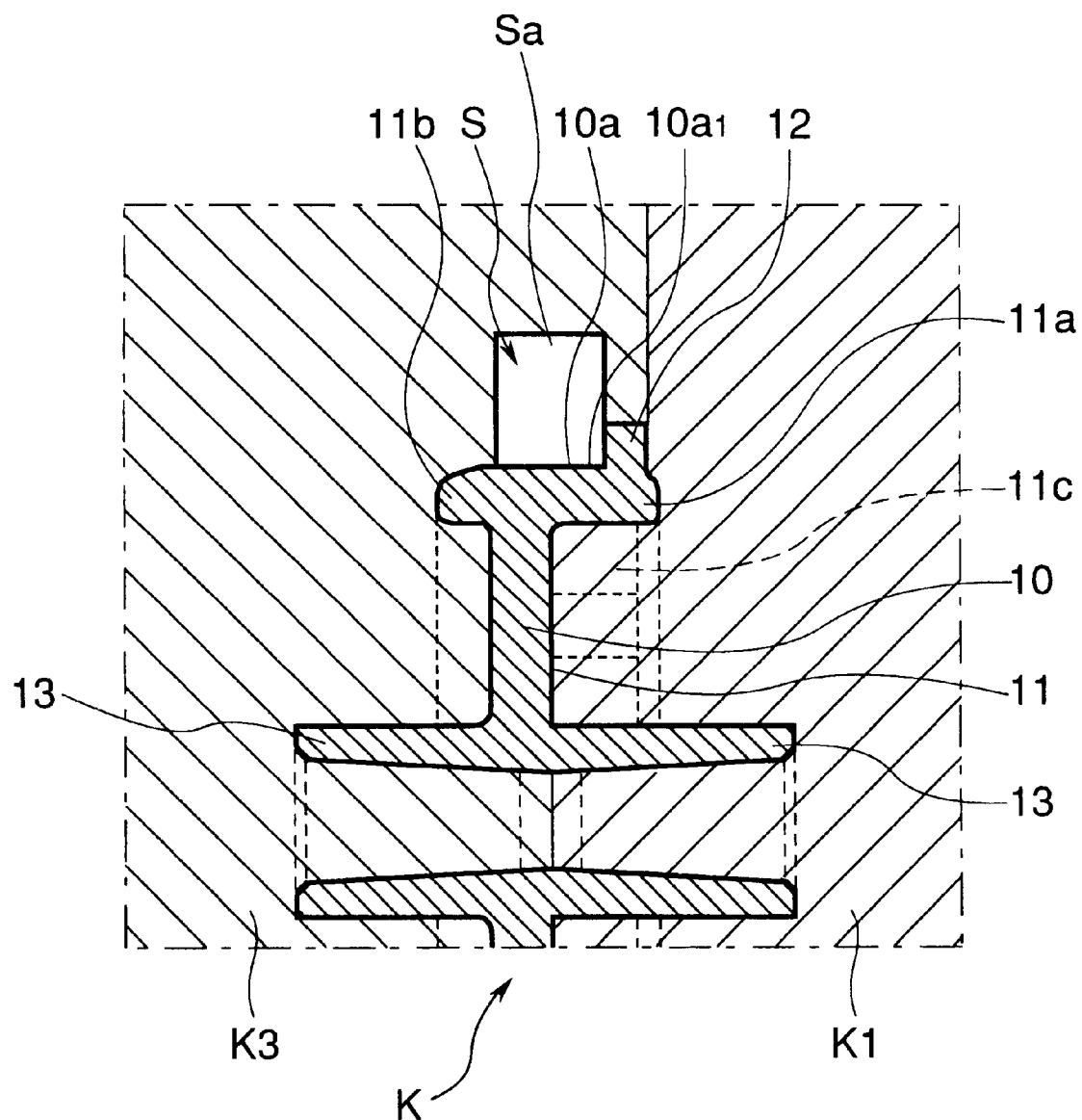
FIG. 5 is a cross-sectional view of essential portions showing the used state of the metal mold K.

The roller R1 of the above-described construction according to the present embodiment can be easily manufactured by injection-molding the roller body portion 10, as shown in FIGS. 4 and 5, and thereafter injection-molding the shock absorbing member 20 so that the injection-molding roller body portion 10 may be integrally provided with the shock absorbing member 20 on the outer peripheral portion 10a thereof.

That is, as shown in FIG. 4, the roller body portion 10 is first injection-molded by the cavity S of a metal mold K comprising a first metal mold K1 and a second metal mold K2. The first metal mold K1 and the second metal mold K2 are adapted to be divided toward the axial direction of the shaft hole 13a of the roller body portion 10. Then, as shown in FIG. 5, only the second metal mold K2 (the metal mold on that side which molds the circumferential wall portion 11b of the roller body portion 10 which is not provided with the flange-like portion 12) is removed from the molded roller body portion 10, whereafter a third metal mold K3 having a clearance Sa following the shape of the shock absorbing member 20 which is in contact with both of the flange-like portion 12 and the outer peripheral surface 10a is assembled to the first metal mold K1 which is not yet removed. Thereafter, the clearance Sa is filled with rubber or elastically deformable synthetic resin (a rubber-like elastic member). Thus, the clearance Sa constitutes a part of the cavity S.

Thereby, the shock absorbing member 20 can be integrally formed on the outer peripheral portion of the roller body portion 10, and the manufacture of the roller R1 becomes markedly easy as compared with a case where the shock absorbing member 20 is fitted to the outer peripheral surface $10a_1$ of the roller body portion 10, whereafter the shock absorbing member 20 and the roller body portion 10 are adhesively secured to each other.

Figure 3:
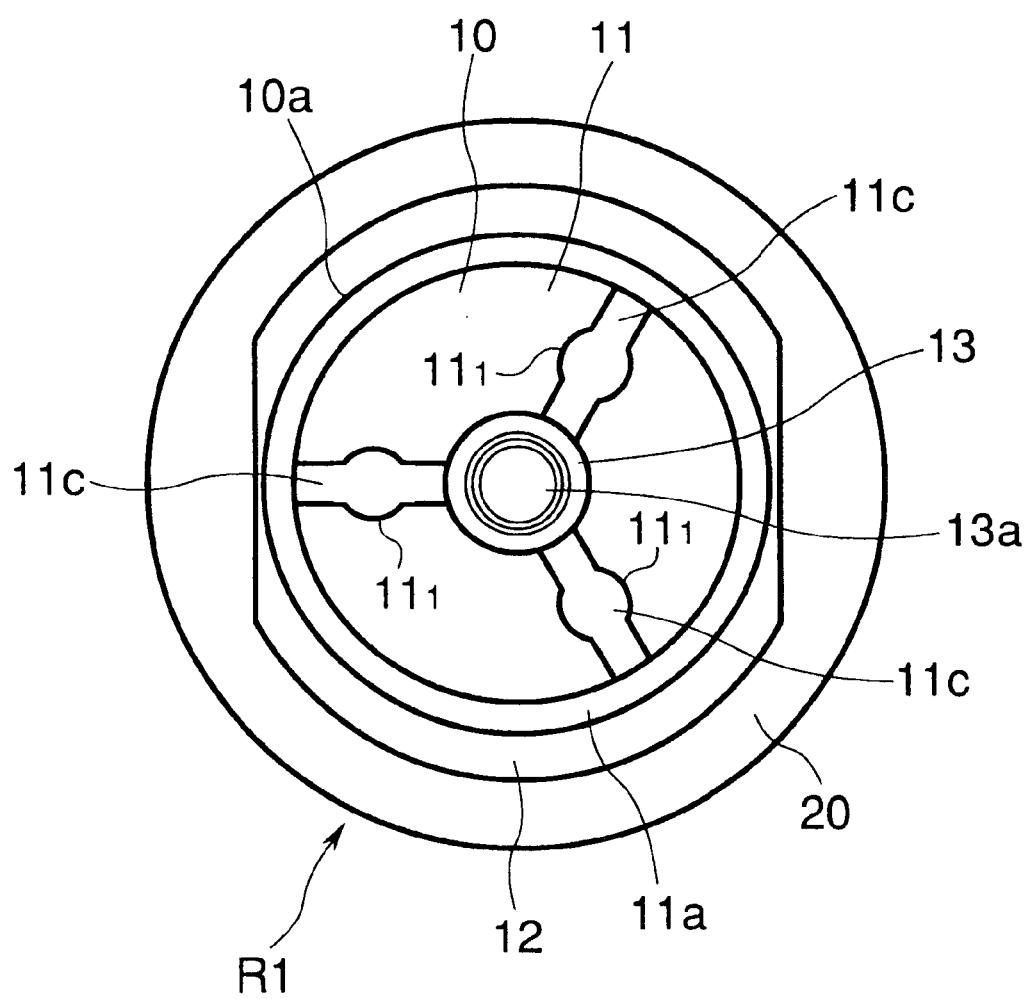
FIG. 3 is another side view of the roller R1 according to the first embodiment of the present invention.

On the base portion 11 on the circumferential wall portion 11a provided with the flange-like portion 12, three rib-like protrusions 11c extending from the shaft boss portions 13 to the circumferential wall portion 11a are radially provided about the shaft boss portions 13. As shown in FIG. 3, a widened portion $11_1$ is formed on the substantially lengthwisely central portion of each of these rib-like protrusions 11c. This widened portion $11_1$ is applied thereto a push-out pin (not shown) provided on the first metal mold K1 when the molded roller R1 is taken out of the first metal mold K1.

The roller R1 according to the present embodiment is integrally provided with the annular shock absorbing member 20 on the outer peripheral portion 10a of the roller body portion 10, and this shock absorbing member 20 is urged against an article or a member. Therefore, it is rare for the article or the like to be injured and a moderate frictional force can be made to act on the article or the like to thereby convey the article or the like well.

(Second Embodiment)

Figure 6:
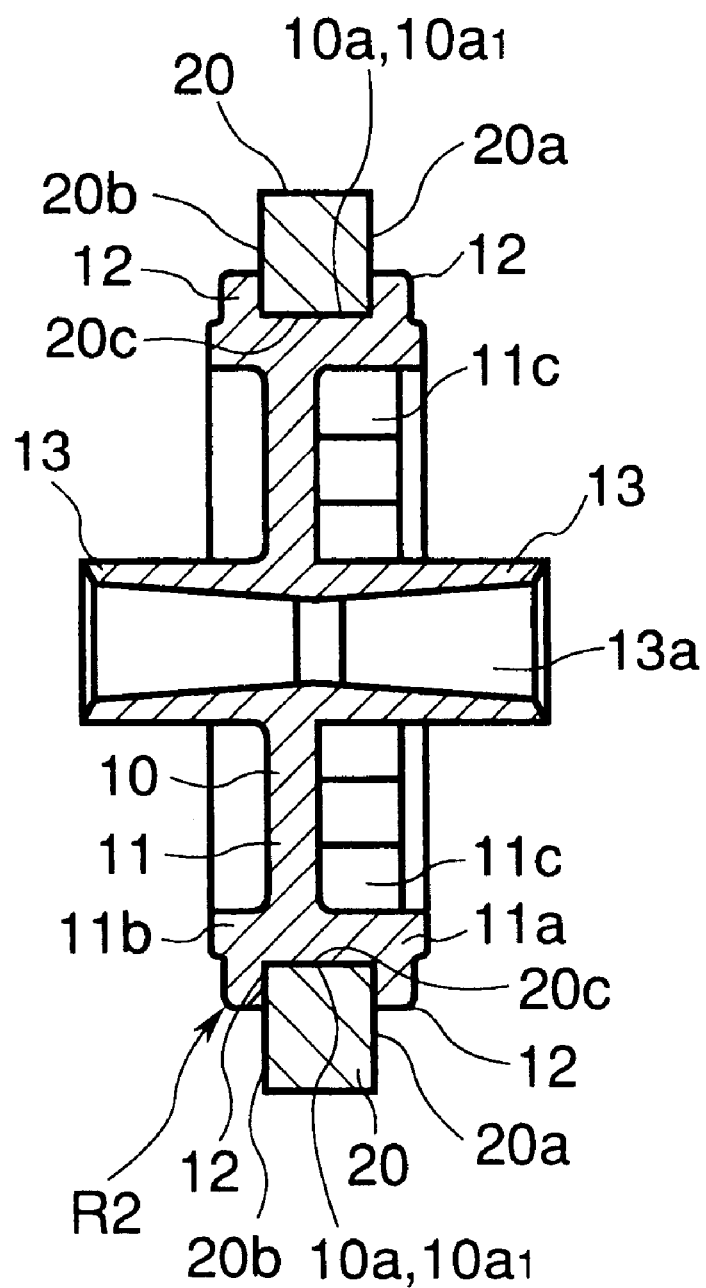
FIG. 6 is a longitudinal cross-sectional view of a roller R2 according to a second embodiment of the present invention.
Figure 7:
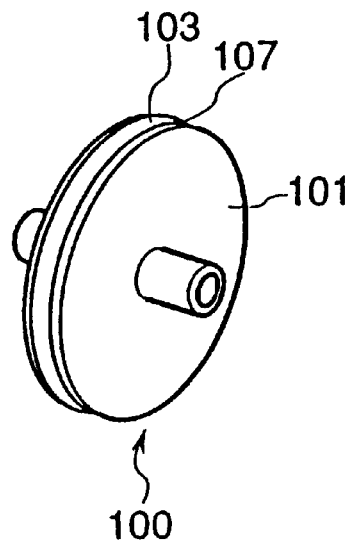
FIG. 7 is a perspective view of a conventional roller.
Figure 8:
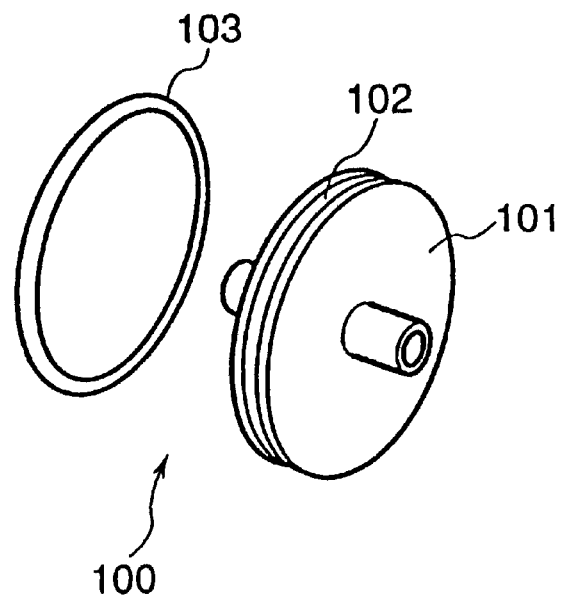
FIG. 8 is an exploded perspective view of the conventional roller.
Figure 9:
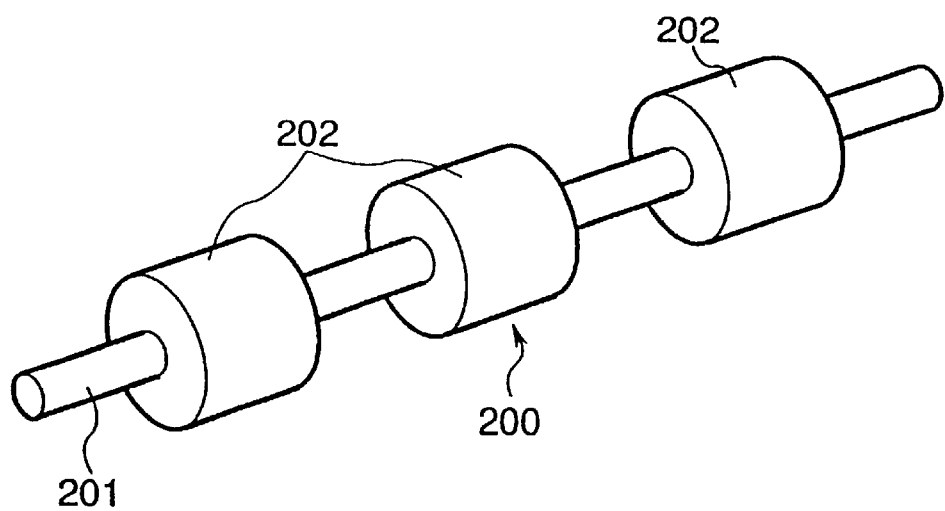
FIG. 9 is a perspective view of a conventional roller.

A roller R2 according to a second embodiment of the present invention will now be described with reference to FIG. 6.

The roller R2 according to this second embodiment, like the roller 1 according to the first embodiment, is comprised chiefly of a disc-like roller body portion 10 and an annular shock absorbing member 20 integrally provided on the outer peripheral portion 10a of the roller body portion 10.

The present embodiment, however, is provided with a pair of flange-like portion 12 protruding radially outwardly from the outer peripheral surface $10a_1$ of the roller body portion 10, on the tip end portions of a pair of circumferential wall portions 11a and 11b provided on the opposite surface sides of the roller body portion 10. The shock absorbing member 20 is contained between the pair of flange-like portion 12, and the shock absorbing member 20 is integrally formed on a collecting portion 10a so that the inner peripheral surface 20c of the shock absorbing member 20 may contact with the outer peripheral surface $10a_1$, and the sides 20a and 20b of the shock absorbing member 20 may contact with the pair of flange-like portion 12. The second embodiment is similar to the first embodiment in that the shock absorbing member 20 is constructed so as to radially outwardly protrude by a predetermined amount from the flange-like portions 12.

As a result, this embodiment can secure the area over which the roller body portion 10 and the shock absorbing member 20 contact with each other more widely than the first embodiment. Also, in this embodiment, the flange-like portion 12 integrally contact with (are secured to) the opposite sides 20a and 20b of the shock absorbing member 20, and therefore when an article or the like is conveyed by the roller R2, the shock absorbing member 20 is not compressed and deformed more than necessary. So, the inconvenience that the tip end surface of the shock absorbing member 20 does not appropriately contact with the article or the like being conveyed becomes more difficult to encounter.

The remaining construction of the roller R2 according to this second embodiment is substantially the same as that of the roller R1 according to the first embodiment. Therefore, substantially the same constituent portions of this embodiment as those of the first embodiment are given the same reference characters as in the first embodiment and need not be described.

As is apparent from the foregoing description, the roller according to the present invention is integrally provided with a shock absorbing member made of a rubber-like elastic material on the outer peripheral portion of the roller body portion made of hard synthetic resin and therefore, when an article is conveyed, the shock absorbing member 20 can be urged against the article being conveyed to thereby make the rotational force of the roller act always accurately on the article, thus conveying the article reliably and smoothly. Also, in the roller of the present invention, the roller body portion is formed of hard synthetic resin which is not deformed by the temperature during the injection molding of the shock absorbing member, and shock absorbing member can be injection-molded with the roller body portion as an insert and the shock absorbing member can be formed integrally with the roller body portion. Therefore, the roller provided with the shock absorbing member can be manufactured easily and the assembled state of the shock absorbing member and the roller body portion can be made firm (the shock absorbing member and the roller body portion can be made firmly integral with each other).

Also, when the roller of the present invention is urged against an article or the like during the conveyance thereof, the portion thereof which is elastically deformed is limited to the shock absorbing member portion integrally formed on the outer peripheral portion and the roller body portion is difficult to elastically deform and the shape keeping power of the roller is maintained. Thus, even when the thicknesses of the shock absorbing member and the roller body portion in the direction of the axis of rotation of the roller are made relatively small, that is, the roller is made relatively thin-walled, the function of the roller is difficult to spoil and it becomes possible to construct the roller compactly.

Also, the roller of the present invention is provided with flange-like portions protruding radially outwardly from the outer peripheral portion of the roller body portion, and is of a construction in which the shock absorbing member is in contact with the outer peripheral surface and the flange-like portions, and the shock absorbing member protrudes radially outwardly by a predetermined amount from the flange-like portions. Therefore, the area over which the roller body portion and the shock absorbing member integrally contact with each other can be secured relatively widely.

Also, even if the roller of the present invention is urged against an article or the like during the conveyance thereof, the shock absorbing member is not deformed more than necessary because the flange-like portions integrally contact with the side of the shock absorbing member, and the shock absorbing member can be appropriately brought into contact with the article or the like to thereby convey the article or the like smoothly and well.

What is claimed is:

1. A roller, comprising:

a roller body made of hard synthetic resin and having a substantially disc-like shape;

an annular shock absorbing member made of a rubber-like elastic material and integrally formed on an outer peripheral portion of said roller body, and a single flange-like portion protruding radially outward from said roller body and being formed on the outer peripheral portion of said roller body, said single flange-like portion being disposed on only one side of said annular shock absorbing member, and said annular shock absorbing member being in contact with said single flange-like portion only at the one side of said annular shock absorbing member, wherein said shock absorbing member is integrally formed on the outer peripheral portion of said roller body so as to protrude radially outward by a predetermined amount from said single flange-like portion, said single flange-like portion is the only flange-like portion contacting said shock absorbing member, said single flange-like portion and said one side of said shock absorbing member are integrally formed with one another, and the outer peripheral portion of said roller body and an inner peripheral surface of said shock absorbing member are integrally formed with one another.

2. A roller according to claim 1, wherein said shock absorbing member is formed of an injection-moldable rubber-like elastic material, and said roller body is formed of synthetic resin which is not deformed by temperature during injection molding of said shock absorbing member.

* * * * *